United States Patent Office

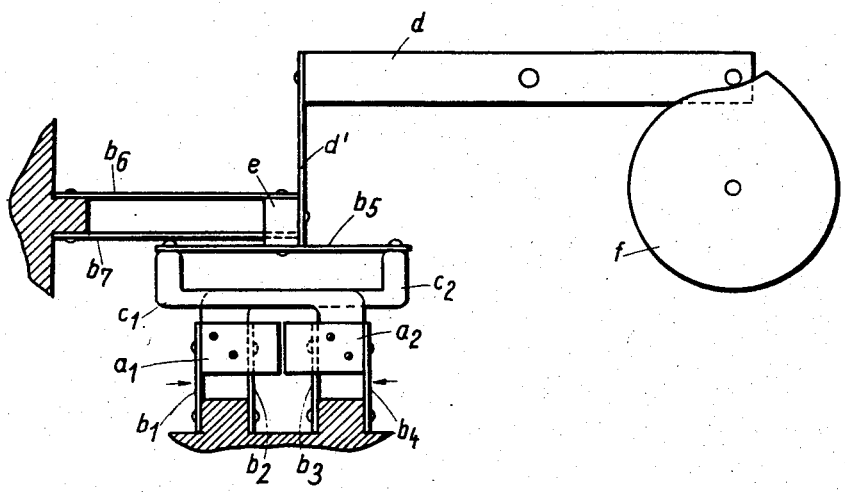

2,795,170
Patented June 11, 1957

2,795,170

VARIABLE SLIT DIAPHRAGM, ESPECIALLY FOR OPTICAL INSTRUMENTS

Gerhard Hansen and Karl-Heinrich Voigt, Heidenheim on the Brenz, Germany, assignors to Carl Zeiss, Heidenheim on the Brenz, Wurttemberg, Germany Application November 24, 1954, Serial No. 470,854

Claims priority, application Germany December 5, 1953

5 Claims. (Cl. 88—61)

Our invention relates to a variable slit diaphragm, especially for optical instruments, such as spectrometers.

An object of our invention is a band-shaped spring, which acts on the slit jaws as a reliable and simple drive for the opening and closing of the slit without backlash.

A further object of our invention is a lever whose one end glides on a rotary cam disk suitably developed as a handwheel and whose other end acts on the band-shaped spring. The said cam disk has suitably a decreasing slope in the direction of the slit closing.

Further objects of our invention are a springy joint which carries the lever, acting on the said band-shaped spring, and springy joints carrying the slit jaws.

The nature of the slit diaphragm according to our invention is described in detail in the description of the drawing showing an example of the invention.

The movable slit jaws $a_1$ and $a_2$ are each connected with two band-shaped springs $b_1$, $b_2$, $b_3$, $b_4$, forming about a link quadrilateral, which are suitably somewhat prestressed in the direction of the arrows, that is in closing direction of the slit diaphragm. On the slit jaws are fastened crossing arms $c_1$ and $c_2$ which are bridged by a not prestressed band-shaped spring $b_5$, serving as drive. At the middle of the band-shaped spring is, attached to a lever $d$, a pin $d'$ carrying a block $e$, which upon swinging of the lever activated by a cam disk $f$ counterclockwise flexes the band-shaped spring $b_5$ downwards, through this, approaches the vertical side pieces of the arms $c_1$ and $c_2$ to one another and correspondingly separates the slit jaws from one another. The block $e$ is rigidly coupled with a further pair of band-shaped springs $b_6$, $b_7$. This likewise forms about a link quadrilateral, and prevents a tilting and a movement of the block $e$ transverse to its direction of activation.

The customary slit diaphragms, variable in their opening, as they find employment especially in optical instruments, like spectral apparatuses, are so constructed, that for moving the slit jaws frictional elements like a pinion drive are employed, which in working together with elastic forces necessarily show a certain lost motion. This results from that practically in all positions of the frictional element a residual of the frictional force is taken up by the elastic element. Therefore such a combination is sensitive to shock. Under shocks the frictional resistance can be overcome and therewith the adjustment changed.

In precision instruments it is required that slit widths can be adjusted by the order of magnitude of 0.001 to 1 mm. with great precision and in agreement with a scale commonly located on the drive.

Therefore, in order to make the drive for the opening-and-closing movement of the slit jaws reliable and simple without lost motion, in accordance with the invention there is provided as drive for the slit opening and closing a band-shaped bending stressed spring, acting on the slit jaws. One has it in hand to prestress the slit jaws in the closing direction or in the opening direction. In the first case the spring serving for the drive can be fastened without prestress on crossed arms, respectively with prestress on not crossed arms of the slit jaws. In the second case the driving spring can act with prestress on the crossed arms, respectively without prestress on the not crossed arms of the slit jaws. The activation of the driving spring appropriately takes place across a lever, which places the driving spring in the middle under bending stress, and which at its other end is connected with a cam disk suitably developed as a handwheel. It has turned out that the slight friction between the free lever end and the cam disk does not involve any disadvantageously effective lost motion for the slit diaphragm adjustment. Suitably a cam is selected whose gradient decreases in the direction of slit closure. Through this the greatest precision of adjustment is assured in the initial range of the opening movement.

In order to fully utilize the absence of lost motion in this kind of drive for the slit jaws, it is suitable to correlate, in a manner familiar as such, to the movable slit jaws for guidance pairs of band-shaped springs operating about like a link quadrilateral. These are friction and torsion free and assure within the range of application a completely linear and frictionless guidance of the movable slit jaws. The prestressing of the slit jaws, in accordance with the invention can also take place by way of the pairs of flat springs serving for their guidance. The driving spring then without prestressing acts on the arms connected with the slit jaws. With crossed arms a prestressing of the guide springs in the closing direction is selected, whereas with not crossing arms the prestressing takes place in the opening direction.

To exclude lateral movements and tiltings of the element mounted on the activating lever, which acts on the flat spring serving as drive, it can be suitable to in turn rigidly couple this element with a pair of springs operating about like a link quadrilateral.

We claim:
1. A slit diaphragm especially for optical instruments such as spectroscopes comprising a base plate, a first and a second slit jaw, two pairs of flat springs, the springs of the one pair being fastened with their one end to said ground plate and with their other end to the first slit jaw and the springs of the other pair being fastened with their one end to the ground plate and with their other end to the second slit jaw so that each pair carries one slit jaw and holds this slit jaw parallel to the other slit jaw when moving the first slit jaw against the second slit jaw, two arms, each of them being fastened on one slit jaw, a flat spring fastened to the ends of said arms, means acting on the flat spring fastened to the arms in order to bend it and thereby to move the slit jaws against each other.

2. Slit diaphragm according to claim 1, characterized in that the said two pairs of flat springs have an initial stress which counteracts the movement of the slit jaws against each other and that the arms fastened to the slit jaws are arranged so that the one arm crosses the other arm.

3. Slit diaphragm in accordance with claim 2, characterized in that the said two pairs of flat springs have an initial stress which counteracts the divergent movement of the slit jaws and that the one arm fastened to the first slit jaw is arranged to extend away from the second slit jaw and the other arm fastened to the second slit jaw is arranged to extend away from the first slit jaw.

4. A slit diaphragm especially for optical instruments such as spectroscopes comprising a base plate, a first and a second slit jaw, two pairs of flat springs, the springs of the one pair being fastened with their one end to said ground plate and with their other end to the first slit jaw and the springs of the other pair being fastened with their one end to the ground plate and with their other end to the second slit jaw so that each pair carries one slit jaw and holds this slit jaw parallel to the other slit jaw when moving the first slit jaw against the second slit jaw, two arms, each of them being fastened on one slit jaw, a flat spring fastened to the ends of said arms, means acting on the flat spring fastened to the arms in order to bend it and thereby to move the slit jaws against each other said means consisting of a lever and a cam rotatable plate as well as a body, one arm of said lever sliding on the cam plate and the other arm being in contact with said body, said body being arranged approximately in the center of said flat spring fastened to the arms and consisting of two further springs which are connected with the body and form a springy support for the body.

5. Slit diaphragm in accordance with claim 4, characterized in that the cam plate has a decreasing slope on its circumference taken in the direction of the slit closing.

References Cited in the file of this patent

UNITED STATES PATENTS

| | | |
|---|---|---|
| 1,661,034 | Duda | Feb. 28, 1928 |
| 2,607,899 | Cary et al. | Aug. 19, 1952 |
| 2,705,440 | George et al. | Apr. 5, 1955 |